(12) United States Patent
Marie et al.

(10) Patent No.: US 10,114,701 B2
(45) Date of Patent: Oct. 30, 2018

(54) SPACE EFFICIENT CASCADING POINT IN TIME COPYING

(75) Inventors: Anan Marie, Haifa (IL); Rivka Matosevich-Mayraz, Haifa (IL)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 1163 days.

(21) Appl. No.: 13/015,743

(22) Filed: Jan. 28, 2011

(65) Prior Publication Data

US 2012/0197842 A1 Aug. 2, 2012

(51) Int. Cl.
*G06F 17/30* (2006.01)
*G06F 11/14* (2006.01)
*G06F 3/06* (2006.01)

(52) U.S. Cl.
CPC .......... *G06F 11/1448* (2013.01); *G06F 3/065* (2013.01); *G06F 3/0608* (2013.01); *G06F 3/0671* (2013.01); *G06F 17/30088* (2013.01); *G06F 17/30327* (2013.01); *G06F 17/30575* (2013.01); *G06F 11/1464* (2013.01); *G06F 2201/84* (2013.01)

(58) Field of Classification Search
CPC ......... G06F 17/30088; G06F 17/30575; G06F 17/30327; G06F 2201/84
USPC .......................................................... 707/639
See application file for complete search history.

(56) References Cited

U.S. PATENT DOCUMENTS

| | | | |
|---|---|---|---|
| 6,594,744 B1 | 7/2003 | Humlicek et al. | |
| 6,611,901 B1* | 8/2003 | Micka et al. | 711/162 |
| 6,934,822 B2* | 8/2005 | Armangau et al. | 711/162 |
| 7,100,089 B1 | 8/2006 | Phelps | |
| 7,467,268 B2* | 12/2008 | Lindemann | G06F 11/1469 711/113 |
| 7,610,318 B2 | 10/2009 | Bartfai et al. | |
| 8,051,259 B2 | 11/2011 | Agombar et al. | |
| 8,423,733 B1* | 4/2013 | Ozdemir | G06F 3/0604 711/162 |
| 8,510,499 B1* | 8/2013 | Banerjee | G06F 12/0246 711/112 |
| 2003/0028737 A1* | 2/2003 | Kaiya et al. | 711/162 |
| 2003/0158862 A1 | 8/2003 | Eshel et al. | |
| 2005/0050110 A1 | 3/2005 | Sawdon et al. | |
| 2006/0139697 A1 | 6/2006 | Fuente | |
| 2006/0200640 A1 | 9/2006 | Agombar et al. | |
| 2006/0230243 A1 | 10/2006 | Cochran et al. | |
| 2007/0022264 A1 | 1/2007 | Bromling et al. | |
| 2007/0106843 A1* | 5/2007 | Mori et al. | 711/114 |
| 2008/0114951 A1 | 5/2008 | Lee | |
| 2008/0307000 A1* | 12/2008 | Paterson | G06F 17/3023 707/999.107 |
| 2009/0106332 A1* | 4/2009 | Agombar et al. | 707/204 |
| 2009/0319735 A1* | 12/2009 | Agombar et al. | 711/162 |
| 2010/0080471 A1* | 4/2010 | Haas et al. | 382/217 |
| 2010/0088468 A1 | 4/2010 | Agombar et al. | |

(Continued)

*Primary Examiner* — Ashish Thomas
*Assistant Examiner* — Jedidiah P Ferrer
(74) *Attorney, Agent, or Firm* — Griffiths & Seaton PLLC (57) ABSTRACT

Embodiments for space-efficient cascading point-in-time copying of source data by creating a plurality of cascading point-in-time target copies, the target copies being created at different points in time, are provided. Data is physically copied form the source to a repository to create a physical copy, and a data mapping is created that associates the physical copy with a most recent target copy.

12 Claims, 9 Drawing Sheets

(56) References Cited

U.S. PATENT DOCUMENTS

2010/0153617 A1* 6/2010 Miroshnichenko et al. ..... 711/6
2010/0318757 A1 12/2010 Beeken et al.
2011/0252067 A1 10/2011 Marathe et al.

* cited by examiner

SPACE EFFICIENT CASCADING POINT IN TIME COPYING

BACKGROUND

The present invention relates to data copying. More particularly, the present invention relates to mapping related to space efficient cascading point-in-time copying.

Point-in-time copying may be applied when a copy of a large quantity of source data is required without disrupting normal operation of a system. With point-in-time copying, the copy of the data becomes immediately available for use. The data in the copy represents the source data at a given instant in time. For example, the data in the copy may, at a later time, be used for creation of a backup copy on another storage medium, or for offline data mining, with minimal disruption of normal system operation.

For example, making an actual or physical copy of source data, wherein data that is identical to source data originally saved at one address is written to another address, may require a significant amount of time. For example, source data may change during the course of making the physical copy. For example, during the course of physically copying data that represents a set of bank accounts, the contents of one of the accounts may change. Thus, the last data copied during physical copying may not be consistent with the first data copied. On the other hand, halting system activities operation during copying may unacceptably disrupt system operation.

Application of point-in-time copying to copy the data, on the other hand, may enable creation of a self-consistent copy of the source data at particular instant in time. The point-in-time copy may be immediately available for use.

Point-in-time copying may include defining a target volume to which the source data may be copied. For example, a data storage controller may initially create a logical copy of the data. For example, a logical copy of data may include a reference to an address where the data is actually stored. For example, a logical copy may include a list or table that links each source data address in the source volume to a target address in the target volume. The table may also indicate whether data at a particular source data address has been physically copied to the target address. Thus, when attempting to read the copied target data from the target volume, a system or program may consult the table. Consultation of the table may indicate whether the data is to be read from its original source address on source volume, or from the target address on the target volume. Typically, creation of a logical copy is faster than creation of a physical copy. Therefore, creation of a logical copy of the source volume at an instant in time may not unacceptably disrupt operation of an associated system.

Typically, implementation of point-in-time copying may include creation of a physical copy on demand. For example, the storage controller may physically copy source data to the target volume when data at the source data address is to be modified, deleted, or overwritten. Such creation of a physical copy on demand typically does not unacceptably disrupt normal system operation.

Implementation of point-in-time copying may enable configuration of more than one target volume that exist concurrently. For example, the implementation may be configured to provide an approximation to continuous data protection (CDP). CDP typically includes creating a copy of data whenever the source data is modified. Thus, the implementation may include assigning a separate target volume to each created copy.

An implementation of multiple-target point-in-time copying may maintain multiple target volumes in the form of a cascaded copying to a cascaded array of target volumes. For example, cascaded copying may enable making only a single physical copy of data that may be shared by two or more logical copies on separate target volumes. Typically, a linked list of pointers may refer a logical copy on one target volume to a physical copy on another target volume. For example, reading a logical copy from a one target volume may redirect the read operation to another target volume that was created at a later time. Such redirection may thus continue along the cascaded array until encountering either a physical copy on a target volume, or the original data on the source volume.

When one of the target volumes is removed or deleted, physical copies of data on the target volume to be removed may be physically copied to a different target volume.

An implementation of multiple target copying may include space efficient point-in-time copying. With space efficient point-in-time copying, all physically copied data resides on a single volume, referred to as a repository.

SUMMARY

According to embodiments of the present invention there is provided a computer implemented method for a space efficient cascading point-in-time copying of source data by creating a plurality of cascading point-in-time target copies, the target copies being created at different points in time. The method includes physically copying data from the source data to a repository to create a physical copy, and creating a data mapping that associates the physical copy with a most recent target copy.

Furthermore, in accordance with embodiments of the present invention, there is provided a computer program product stored on a non-transitory tangible computer readable storage medium for a space efficient cascading point-in-time copying of source data by creating a plurality of cascading point-in-time target copies, the target copies being created at different points in time. The computer program includes code for physically copying data from the source data to a repository to create a physical copy, and creating a data mapping that associates the physical copy with a most recent target copy.

Furthermore, in accordance with embodiments of the present invention, there is provided a data processing system for a space efficient cascading point-in-time copying of source data by creating a plurality of cascading point-in-time target copies, the target copies being created at different points in time. The system includes a processor; a computer usable medium connected to processor. The computer usable medium contains a set of instructions to physically copy data from the source data to a repository to create a physical copy, and create a data mapping that associates the physical copy with a most recent target copy.

BRIEF DESCRIPTION OF THE SEVERAL VIEWS THE DRAWINGS

The subject matter regarded as the invention is particularly pointed out and distinctly claimed in the concluding portion of the specification. The invention, however, both as to organization and method of operation, together with objects, features, and advantages thereof, may best be understood by reference to the following detailed description when read with the accompanying drawings in which:

DETAILED DESCRIPTION

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any non-transitory, tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Flowchart/s and block diagram/s in the figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

Space efficient cascading multiple-target point-in-time copying, in accordance with embodiments of the present invention, may include providing a common repository that is common to an cascading array of multiple (two or more) target copies. Each target copy includes logical copies of data in a source volume. For example, each target copy may be created at a different point in time. The common repository, as well as the target copies, may reside on the same physical storage device as the source volume, or on a separate storage device.

The various target copies may be configured to be accessed as separate data storage volumes. Alternatively, a target copy may be configured as a table, structure, or other appropriate configuration known in the art, that resides within a data storage volume or partition. Similarly, the repository or source may be configured as separate volumes, or may represent a set of data storage addresses within a data storage volume. Within this description, a source, repository, or target volume is to be understood as referring to either a separate volume, or to any appropriate alternative data storage configuration.

For example, successive point-in-time copy operations may create multiple target volumes, each including a logical copy of source data. More than one separate target volume, or space efficient volume, may include a logical copy of the same source data. Subsequent physical copying of the data may include copying the source data to a repository address of the common repository. Physically copying the data from the source volume to the common repository may include creation of a mapping associated with the target volume. The mapping may include an association of a target address of a logical copy on the most recently created target volume with a repository address of the corresponding physical copy on the common repository. In this manner, allocated storage space for physical copies of the data may reside entirely in the common repository.

For example, implementation of the mapping from a target data address space to the repository data address space may include application of a B-tree structure as is known in the art. The B-tree structure is typically arranged in the form of nodes and leaves. Implementation of the mapping using a B-tree structure may enable a rapid lookup method for connecting a target data address of a logical copy to a corresponding repository data address of a physical copy. For example, nodes of the B-tree structure may include a key for use in searching the B-tree structure. Data that is stored in leaves of the B-tree structure may include a representation of a repository address of a physical copy and the target address of a corresponding logical copy.

Alternatively, the mapping may include, for example, a hash table, an array, or any other data mapping structure known in the art.

In accordance with some embodiments of the present invention, each leaf may include at least one additional data field. For example, an additional data field may include a flag field that indicates whether a physical copy on the repository is shared among more than one logical copy. The flag field may indicate whether a repository address that corresponds to a particular logical copy on a given target volume also corresponds to a logical copy on another target volume in a cascading point-in-time copy configuration.

In accordance with some embodiments of the present invention, a newly created target volume may include a logical copy of source data that had been previously logically copied to a previous target volume. Subsequent physical copying of a source data block (e.g. a data track of a data storage device) from the source volume to a physical copy on the repository may include adding a new mapping to a B-tree structure. The new mapping may show the association between the logical copy on the most recently created target volume and a corresponding physical copy on the repository. Addition of the new mapping may include setting a flag field that indicates that the physical copy on the repository is shared. (Modification of data on the target volume, for example, by a host system, may include resetting the corresponding flag field to indicate that the data at the target volume address is no longer shared.)

For example, a source data block on the source volume may include a time stamp that indicates when data on the source data block was last modified or overwritten. Thus, the source data time stamp may indicate that the source data block is older than the time of creation of the previous target volume that was created prior to the most recent target volume. In this case, the source data may correspond to logical copies in both the most recently created target volume and in the previous target volume. Thus, physically copying the data and adding a leaf to the B-tree structure includes setting the flag field to indicate that the data is shared. On the other hand, the source data time stamp may indicate that the source data was modified more recently than creation of the previous target volume. In this case, only the logical copy in the most recently created target volume may correspond to the source data. Any previous logical copies would refer to a physical copy of an earlier version of the data. In this case, physically copying the data and adding a leaf to the B-tree structure does not include setting the flag field, since the data is not shared.

Removing a target volume from a cascading chain of target volumes may include performing a merge operation between a B-tree that corresponds to the removed volume and any B-trees that represent previous target volumes. The merge operation includes consideration of the current setting of the flag field that indicates whether or not a given mapped data block is shared with previous target volumes. Thus, removal of a target volume does not require any physical copying of data.

Figure 1A:
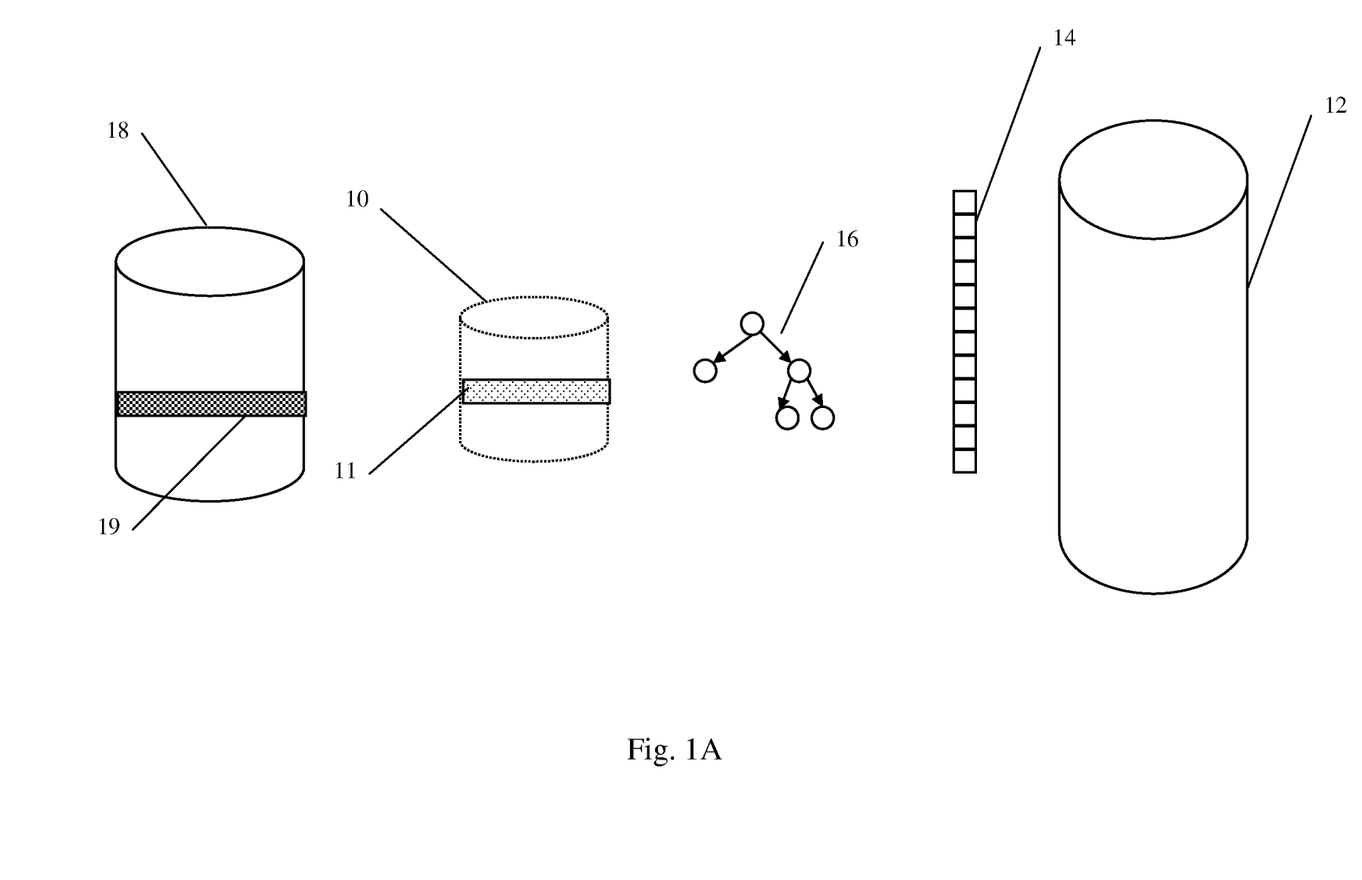
FIG. 1A illustrates schematically a space-efficient point-in-time copy architecture in accordance with embodiments of the present invention.

FIG. 1A illustrates schematically a space-efficient point-in-time copy architecture in accordance with embodiments of the present invention. A target volume 10 represents a logical point-in-time copy of source volume 18 at a particular point in time. In particular, target data block 11 of target volume 10 may include a logical copy of source data block 19 of source volume 18. For example, source data block 19 may include a current value of a variable or a program instruction. Since target volume 10 contains a logical copy of the data, no allocated data storage space need be associated with it. All allocated data storage space may reside in repository 12. Free-space management module 14 may control allocation and de-allocation of data storage space in repository 12 as needed.

For example, in the situation shown in FIG. 1A, source data block 19 has not been copied to repository 12. An external system may access data in a target volume 10. The external system may be configured to perform one or more operations that require reading data from a target volume 10. For example, the external system may be configured to create a backup copy of data that was logically copied to a target volume on a secure medium, such as magnetic tape, alternate hard drive, or remote data storage medium. As another example, the external medium may be configured to perform data mining on data of target volume 10.

A mapping, such as a mapping tree 16, is associated with each target volume 10. Each mapping tree 16 includes a map that associates an address in an associated target volume 10 with a corresponding data storage address in repository 12.

For example, when the external system performs a read operation on a target data block 11 on a target volume 10, a space-efficient point-in-time copy system may redirect the external system to the data of source data block 19 of source volume 18. Alternatively, the space-efficient point-in-time copy system may redirect the external system to another, more recently created, target volume. In this manner, the external system may interact with a target volume 10 as with any other type of data storage volume.

Figure 1B:
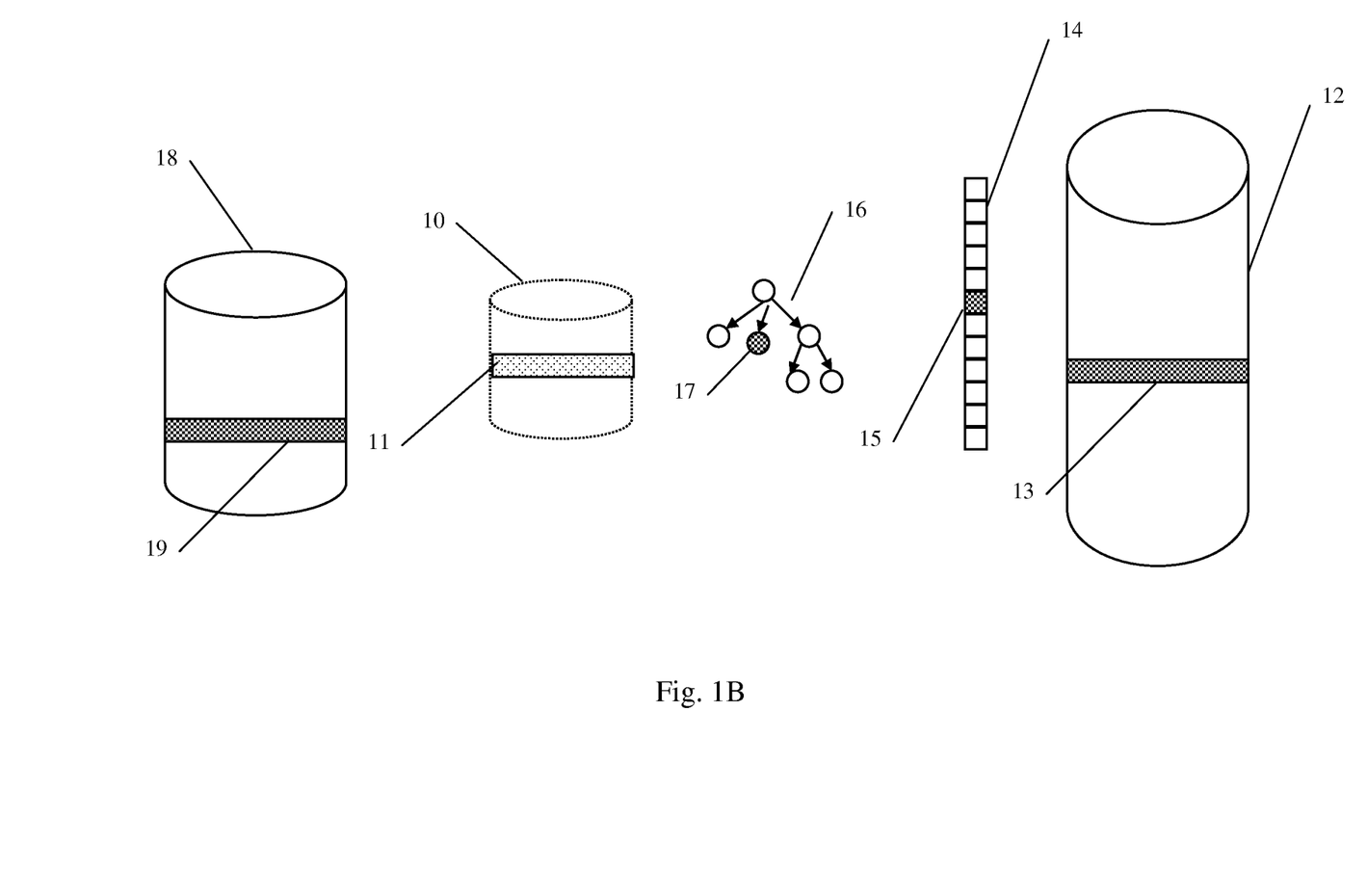
FIG. 1B illustrates physical copying of data with the space-efficient point-in-time architecture shown in FIG. 1A.

FIG. 1B illustrates physical copying of data with the space-efficient point-in-time architecture shown in FIG. 1A. For example, prior to overwriting source data block 19 of source volume 18, the data of source data block 19 may be copied to repository 12. Free-space management module 14 may determine that repository data block 13 is available on repository 12. Thus, the data of source data block 19 may be copied to repository data block 13. Free space management module 14 may mark repository data block 13 as occupied. For example, free space management module 14 may modify a table entry 15 to indicate that repository data block 13 is occupied.

Copying the data of source data block 19 to repository data block 13 may include modifying a mapping, such as a mapping tree 16, associated with target volume 10. Mapping tree 16 includes a map that associates an address in target volume 10 with a corresponding data storage address in repository 12. Typically, physically copying data from source data block 19 to repository data block 13 results in modification of a mapping tree 16 that is associated with target data block 11 on the most recently created target volume 10. For example, a leaf 17 may be added to a mapping tree 16 that is associated with a target data block 11 on target volume 10. Leaf 17 may include an address that represents associated target data block 11 and an address that represents corresponding repository data block 13.

For example, when an external system performs a read operation on a target data block 11 on a target volume 10, a space-efficient point-in-time copy system may redirect the external system to the data of repository data block 13 on repository 12.

Space-efficient point-in-time copying, in accordance with some embodiments of the present invention, may include mapping of a cascading chain configuration.

Figure 2A:
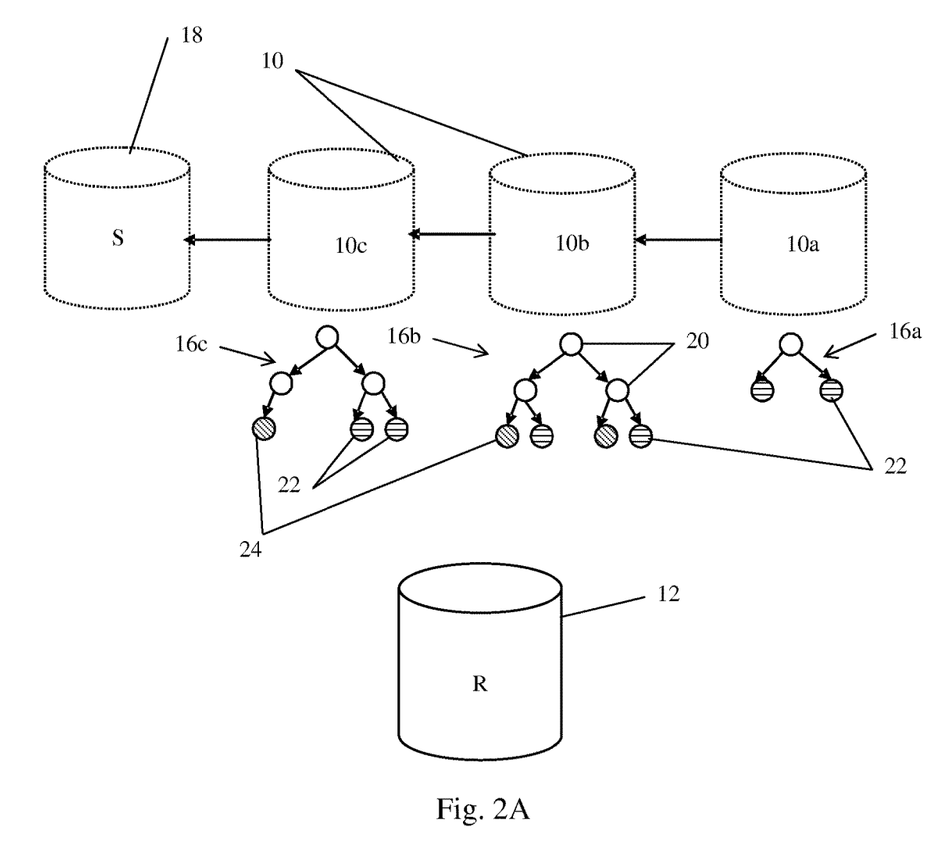
FIG. 2A illustrates mapping of a cascading chain configuration of space-efficient point-in-time copying, in accordance with some embodiments of the present invention.

FIG. 2A illustrates mapping of a cascading chain configuration of space-efficient point-in-time copying, in accordance with some embodiments of the present invention. A cascading chain configuration of space-efficient point-in-time copying includes creating logical copies of source volume 18 at successive points in time. For example, the point-in-time copying may include creation of a series of target volumes 10, individually designated as 10a-10c. In this example, target volume 10a may have been created prior to target volume 10b, and target volume 10b prior to target volume 10c.

At the point in time illustrated in FIG. 2A, some of the data that had been logically copied to target volumes 10a-10c had been physically copied to repository 12. Therefore, a mapping tree 16a-16c that was created for each of associated target volumes 10a-10c may associate one or more logical copy data addresses on each of target volumes 10a-10c with corresponding physical copy data addresses on repository 12.

For example, if an external system attempts to perform a read operation on a logical copy of target volume 10a, data associated with the logical copy may redirect the read operation to the location of the physical data. For example, if the associated source data was physically copied to repository 12 prior to creation of target volume 10b, mapping 16a may redirect the read operation to an appropriate address of repository 12. On the other hand, if the associated source data was not physically copied prior to creation of target volume 10b, the logical copy may redirect the read operation to a corresponding logical copy on target volume 10b. In this manner, the redirection continues from to target volume 10b to target volume 10c, and from there to source volume 18, unless a mapping associated with target volume 10b or target volume 10c redirects the read operation to repository 12.

Typically, a mapping tree 16a-16c may be in the form of a B-tree. A mapping tree 16c may include inner nodes 20, as well as leaves. Inner nodes 20 may contain information, such as a key, that assists in searching the tree. Each leaf of mapping tree 16c may include, for example, a pair of addresses. One address may indicate a logical copy of data on an associated target volume 10c. The other address may indicate a location of a corresponding physical copy of the same data on repository 12.

A leaf of a mapping tree 16c may also include a flag field, or other indication as known in the art, that indicates whether or not a mapping of a logical copy to its corresponding physical copy is shared with a logical copy on a previously created target volume 10b. For example, a flag field of a non-shared mapping leaf 22 may not be set, thus indicating that the mapping is not shared. In this example, a physical copy of data associated with a shared mapping leaf 22 may not correspond to any previous logical copies on previously created target volume 10b. For example, at the time of creation of target volume 10c, the data at a corresponding address of source volume 18 may have been overwritten after creation of previous target volume 10b.

On the other hand, a set flag of a shared mapping leaf 24 may indicate that the address of a physical copy on repository 12 is shared at least with previously created target volume 10b, and possibly with target volume 10a. For example, a logical copy on each of target volumes 10c and 10b may both refer to data that was physically copied to a specific address on repository 12. In this example, data at a corresponding address on source volume 18 may not have been overwritten between creation of target volume 10b and target volume 10c.

Figure 2B:
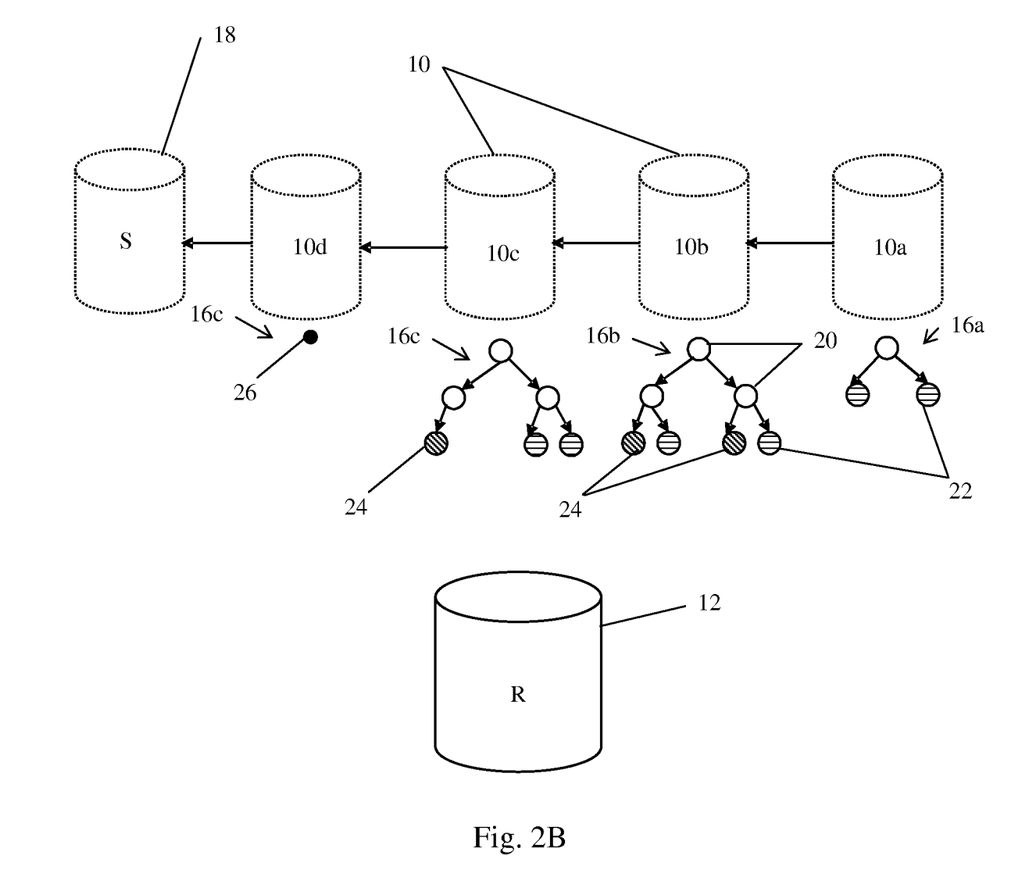
FIG. 2B illustrates mapping addition of a target volume to the cascading array shown in FIG. 2A.

At a point in time later than that shown in FIG. 2A, another target volume may be added. FIG. 2B illustrates mapping addition of a target volume to the cascading array shown in FIG. 2A. Target volume 10d may have been created after previous target volumes 10a-10c. At the point in time illustrated in FIG. 2B, no data corresponding to any logical copy on target volume 10d has yet been physically copied to repository 12. Thus, all logical copies on target volume 10d refer back to corresponding data addresses on source volume 18. Thus, no mapping to repository 12 is yet required. Therefore, mapping tree 16d associated with target volume 10d includes an empty tree 26.

Once target volume 10d has been created, any modification or overwriting of source data on source volume 18 may cause physical copying of source data from source volume 18 to repository 12. Physical copying of source data from source volume 18 to repository 12 may require modification of mapping tree 16d. For example, modification of mapping tree 16d may include mapping an address of a logical copy on target volume 10d to an address of a corresponding newly created physical copy on repository 12. Such a mapping may be shared. For example, a time stamp of the source data may indicate that the source data was modified prior to creation of previous target volume 10c. Thus, the physical copy on repository 12 of that source data may correspond to a logical copy on both most recent target volume 10d, and on previous target volume 10c.

Figure 2C:
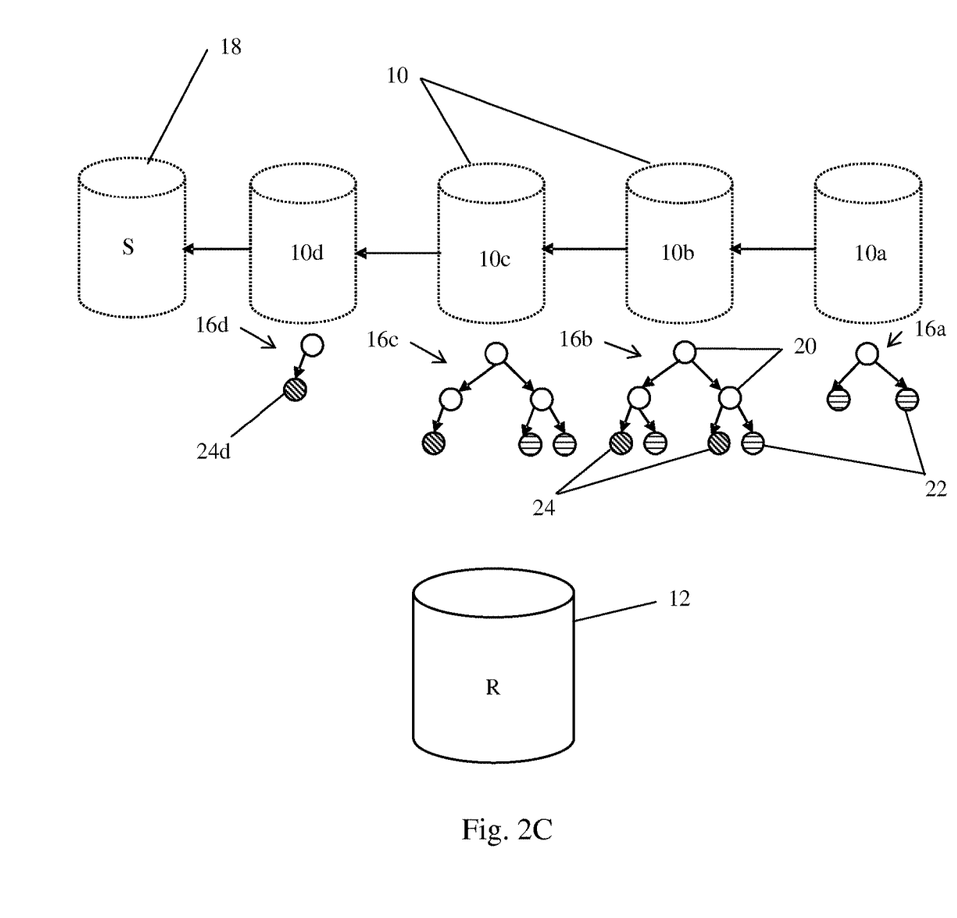
FIG. 2C illustrates addition of a shared mapping to the mapping tree shown in FIG. 2B.

FIG. 2C illustrates addition of a shared mapping to the mapping tree shown in FIG. 2B. A shared mapping may be included in shared mapping leaf 24d. Shared mapping leaf 24d may include a flag field that is set to indicate that the corresponding physical copy of the data is shared with at least a logical copy on target volume 10c. For example, the mapping of shared mapping leaf 24d may indicate that an associated physical copy of data on repository 12 corresponds to a logical copy of the data on both most recent target volume 10d and on previous target volume 10c. The flag field typically does not indicate whether or not a physical copy of the data also corresponds to a logical copy on any target volume (e.g. target volume 10b or 10a) that was created prior to creation of target volume 10c. For example, a corresponding data address on source volume 18 may not have been modified between creation of target volume 10c and of target volume 10d. Thus, a physical copy of the data on repository 12 may correspond to a logical copy on target volume 10c, as well as to a logical copy on target volume 10d.

Figure 2D:
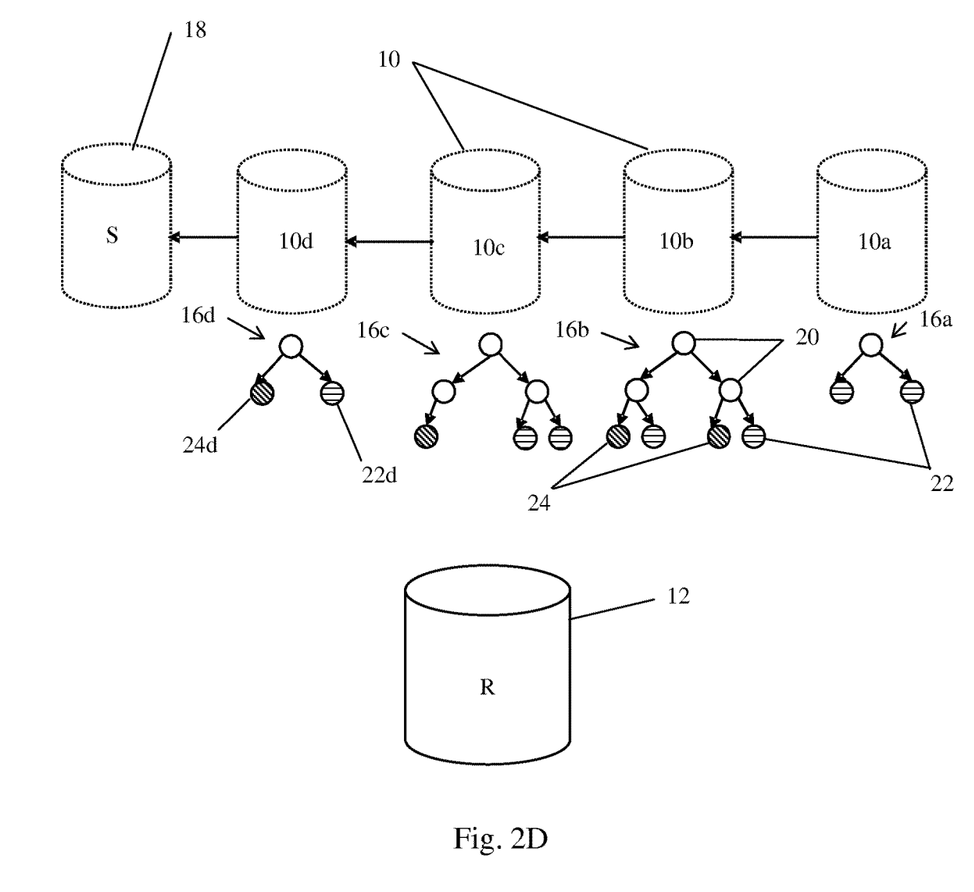
FIG. 2D illustrates addition of a non-shared mapping to the mapping tree shown in FIG. 2C.

On the other hand, a physical copy of the data may not be shared. For example, a time stamp of the source data on source volume 18 may indicate that source data corresponding to a logical copy on target volume 10d was modified after creation of previous target volume 10c. In this case, logical copies on any of previous target volumes 10a-10c may correspond to source data that no longer existed in its original form when a logical copy on target volume 10d was created. FIG. 2D illustrates addition of a shared mapping to the mapping tree shown in FIG. 2C. A non-shared mapping may be included in non-shared mapping leaf 22d. A flag field of non-shared mapping leaf 22d may not be set, thus indicating that a corresponding physical copy on repository 12 may not be shared with a logical copy on previous target volume 10c (or on any prior target volume).

Figure 3:
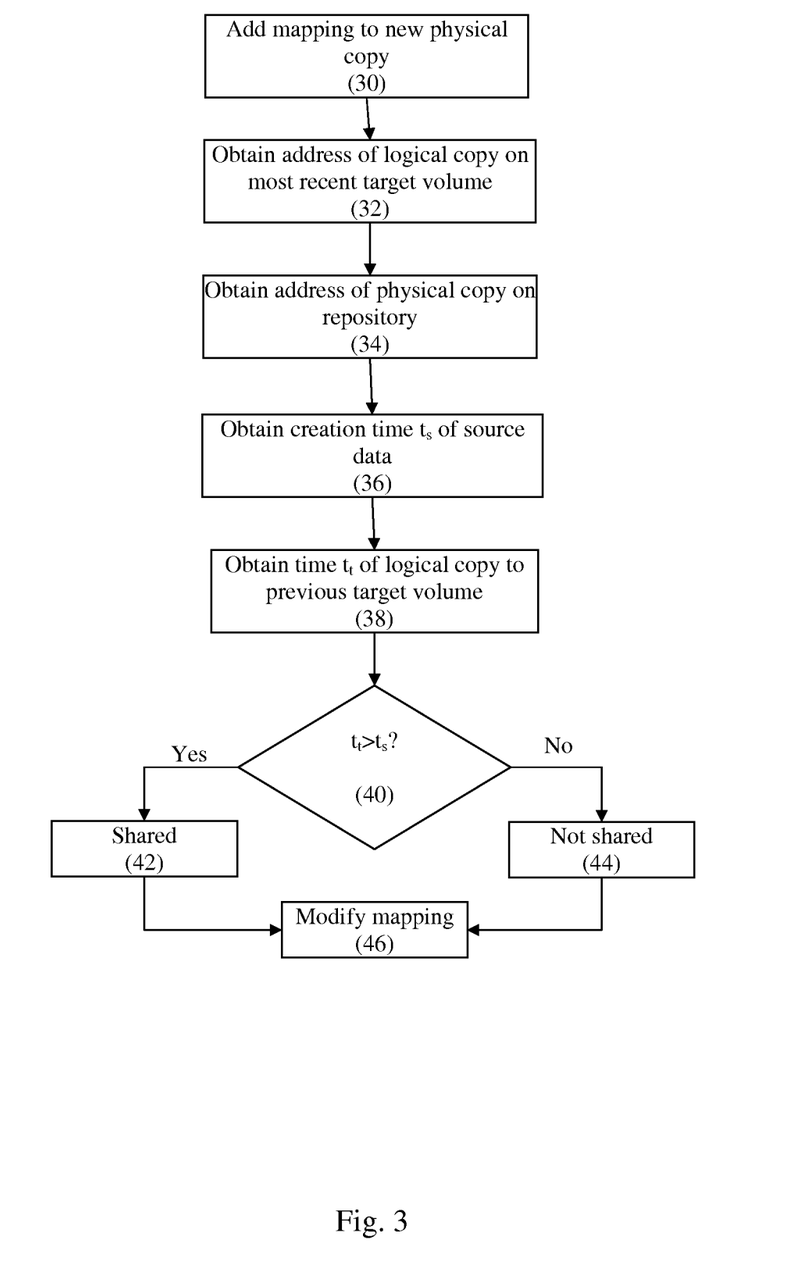
FIG. 3 is a flowchart of a method for adding a mapping from a logical copy on a target volume to a physical copy on a repository, in accordance with some embodiments of the present invention.

FIG. 3 is a flowchart of a method for adding a mapping from a logical copy on a target volume to a physical copy on a repository, in accordance with some embodiments of the present invention. For example, physically copying data from a source volume to a repository may include addition of a new data mapping (step 30). Physical copying of data may precede, for example, modification of source data that corresponds to a logical copy on a target volume. An impending modification may include overwriting source data at a source data address on a source volume. Addition of a new mapping may include creation of a data structure that includes information that associates a logical copy of the source data on the most recently created target volume with a corresponding physical copy of the source data on the repository.

Therefore, addition of a mapping may include obtaining a target address of a logical copy on the most recently created target volume (step 32). Addition of the mapping may also include obtaining an address of the corresponding physical copy of the source data (step 34). For example, prior to physically copying the source data, a repository space management module may locate an appropriate available data block on the repository. Thus, the repository space management module may provide an address of the located repository data block to the additional mapping.

Addition of a mapping in accordance with embodiments of the present invention may include determination of whether the corresponding physical copy also corresponds to another logical copy on a previous target volume that was created prior to the most recent the most recent target volume. For example, the source data may include a time stamp that indicates a creation time $t_s$ of the source data. The time stamp may indicate when source data at the source address was last modified or overwritten. A program or module that manages the mapping may obtain creation time $t_s$ by reading the time stamp (step 36).

In addition, the program or module may obtain a creation time $t_t$ of a logical copy to a previous target volume that was last created prior to creation of the most recent target volume (step 38) For example, each target volume may include a time stamp that indicates the point in time $t_t$ corresponding to creation of the logical copies included in that target volume. Thus, the program or module may obtain the previous target volume creation time $t_t$ by reading the time stamp of the target volume.

A comparison of source data creation time $t_s$ with previous target volume creation time $t_t$ (step 40) may indicate whether the physical copy is shared with a logical copy in the previous target volume. For example, if $t_t$ is later than $t_s$, the source data was modified prior to creation of the previous target volume. Thus, logical copies in both the most recent and in the previous target volumes may both refer to the same source data, and thus share the corresponding physical copy (step 42). On the other hand, if $t_t$ is not later than $t_s$, then the source data may have been modified after creation of the previous target volume. Thus, any logical copy in the previous target volume may only refer to a value of source data prior to modification, while the logical copy in the most recent target volume may refer to a value of the source data after modification. Therefore, a physical copy corresponding to the logical copy in the most recent target volume may not be shared with any previously created target volume (step 44). The additional mapping may thus include an indication, for example in the form of a flag field of a data structure, or in any other appropriate form known in the art, of whether the physical copy is shared with a logical copy in a previous target volume.

Thus, the additional mapping may include at least an address of a logical copy in the most recently created target volume, an address of a physical copy in the repository, and an indication of whether or not the physical copy is shared (step 46). For example, the additional mapping may be in the form of a data structure with various data fields, or in the form of a leaf of a B-tree structure.

Data mapping in accordance with embodiments of the present invention may facilitate modification of the mapping of a target volume. For example, removal of a designated target volume may include modification of a mapping of an older target volume, without any physical copying of data associated with the removed volume. As another example, modification of a value of data in a designated target volume may require revising mapping of an older target volume.

Figure 4:
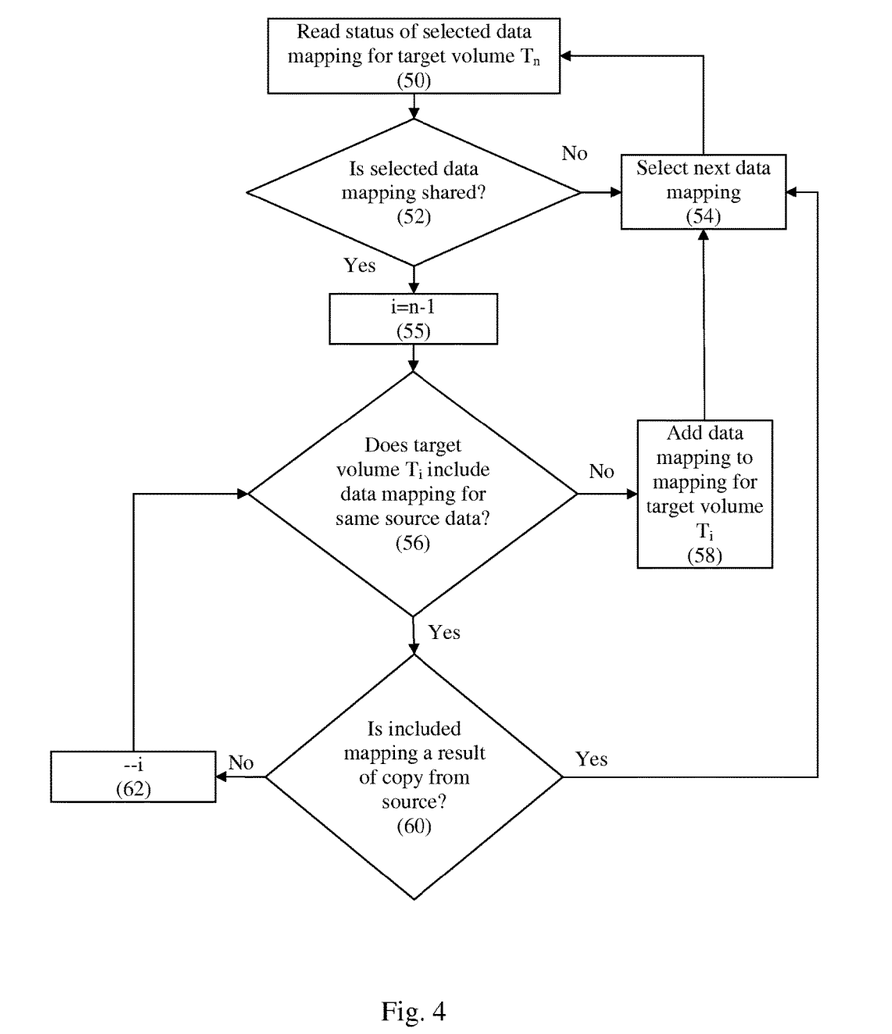
FIG. 4 is a flowchart of a method of revising a mapping, in accordance with some embodiments of the present invention.

FIG. 4 is a flowchart of a method of revising a mapping, in accordance with some embodiments of the present invention.

Typically, a designated target volume $T_n$, may include one or more logical copies of source data from a source volume. Typically, designated target volume $T_n$, also includes several mappings, each associated with a target data block that corresponds to a source data block whose data was overwritten. Each mapping associates a target data block of designated target volume $T_n$, with a corresponding physical copy on a repository. For example, a mapping may be in the form of a B-tree whose leaves represent individual data mappings of individual data blocks. Modification of the mapping may include reading a selected data mapping for designated target volume $T_n$, (step 50), for example, a selected leaf of a B-tree associated with designated target volume $T_n$. The selected data mapping (leaf) may typically include an indication of whether or not the data mapping is shared with one or more previous target volumes. Thus, modification of the mapping may include reading that indication (step 52). If the selected data mapping is not shared, nothing further need be done with regard to that data mapping, and another data mapping (leaf) associated with designated target volume $T_n$ may be selected for examination (step 54).

When the selected data mapping is shared, a mapping (B-tree) associated with target volume $T_i$ created previously to designated target volume $T_n$, where i=n-1, is examined (step 55). For example, a B-tree associated with target volume $T_i$ may be searched, for example, using a key for that B-tree. Examination of target volume $T_i$ may reveal a target data block that refers to the same source data as the selected mapping, but for which no mapping exists (step 56). In this case, the selected data mapping (leaf) is copied from the mapping (B-tree) associated with designated target volume $T_n$ to the mapping (B-tree) associated with target volume $T_i$ (step 58). Another data mapping (leaf) may then be selected for examination (step 54). The process may then be repeated for the next selected data mapping (returning to step 50).

A data mapping (leaf) may be found on a mapping (B-tree) associated with target volume $T_i$ that corresponds to the same source data address as the selected data mapping. The reason for that mapping may then be determined (step 60). For example, a flag field or other stored indication may indicate a reason for the mapping. One possibility (e.g. for an embodiment of the present invention in which the original mapping is occasionally inaccurate) is that the corresponding data mapping for target volume $T_i$ results from physically copying data from the source volume to the repository. In this case, no further action need be taken with respect to the selected data mapping and another data mapping for designated target volume $T_n$ may be selected for examination (returning to steps 54 and 50). Another possibility is that the data mapping (leaf) for target volume Ti was created as a result of manipulation by another process not related to point-in-time copying. For example, a host system may modify data associated with the corresponding logical copy on a target data block of target volume $T_i$. Modification of the data may have included writing a modified value on a data block of the repository, and creating a data mapping (leaf) that associates the target data block with the repository data block. If the mapping resulted from target data block manipulation, no action is performed on the mapping (B-tree) associated with target volume $T_i$. However, a target volume created prior to target volume $T_i$ (i→i−1) may then be examined (step 62). The process is repeated (returning to step 56) until a target volume with no corresponding data mapping is found, or a corresponding data mapping that is associated with copying from the source volume is found.

Once the mapping is revised, the intended action may be performed on designated target volume $T_n$. For example, designated target volume $T_n$ may be removed or deleted, or a value of data of designated target volume $T_n$ may be modified.

Figure 5:
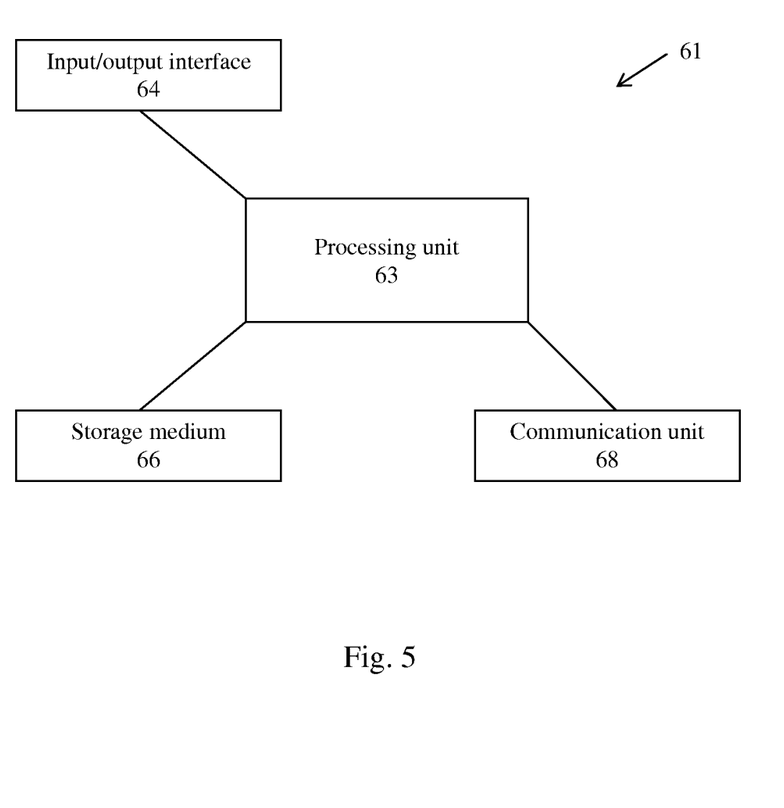
FIG. 5 is a schematic diagram of a computerized system for space efficient cascading point-in-time copying in accordance with embodiments of the present invention.

FIG. 5 is a schematic diagram of a computerized system for space efficient cascading point-in-time copying in accordance with embodiments of the present invention. Computerized system 61 may include a processing unit 63, which may include a single processor or a plurality of processors. Processing unit 63 may communicate with an input/output unit 64. Input/output unit 64, may include, for example, a keyboard, a pointing device, a touch screen, a printer, a scanner, or a monitor. Processing unit 63 may include a storage medium 66 on which a computer executable program may be stored, which includes instructions to perform a method according to embodiments of the present invention. Storage medium 66 may include, for example, a hard-disk, flash memory, floppy disk, disk-on-key. Processing unit 63 may include a communication unit 68 for communicating with another system across a communication line or a network, over a communication wire or wires or wirelessly.

What is claimed is:

1. A computer program product stored on a non-transitory tangible computer readable storage medium for a space efficient cascading point-in-time copying of source data by creating a plurality of cascading point-in-time target copies, the target copies being created at different points in time, the computer program including code for physically copying data from the source data to a repository to create a physical copy;

creating a data mapping that associates the physical copy with a most recent target copy of said plurality of cascading target point-in-time copies, the data mapping indicating shared mapping and non-shared mapping, the shared mapping indicating that an address of the physical copy in the repository, the repository not comprising a cache, is shared with at least one previously created target copy of said plurality of cascading point-in-time copies; wherein the source data includes a time stamp of when a data block of the source data was last modified or overwritten, and if the time stamp indicates the source data is older than a time of creation of a previous target volume which was created prior to the most recent target copy of a most recent target volume, the source data corresponds to logical copies in both the most recent target volume and the previous target volume and the data mapping indicates the source data as shared; otherwise, if the time stamp indicates the source data was modified more recently than the time of creation of the previous target volume which was created prior to the most recent target copy of the most recent target volume, the data mapping indicates the source data as non-shared;

receiving a request to perform a read operation on a logical copy of one target copy of said plurality of cascading target point-in-time copies;

in response to the request, directing the read operation to a corresponding address of the repository if the step of physically copying data from the source data was performed prior to the creation of the one target copy of said plurality of cascading target point-in-time copies, and directing the read operation to the logical copy of the one target copy of said plurality of cascading target point-in-time copies if the step of physically copying data from the source data was performed after the creation of the one target copy of said plurality of cascading target point-in-time copies; and updating the data mapping of one or more target copies of said plurality of cascading target point-in-time copies that are older than a designated target copy of said plurality of cascading target point-in-time copies, so as to include information relating to the designated target copy;

wherein the data mapping comprises a leaf of a B-tree structure, and the B-tree structure includes inner nodes and one or more leaves, the inner nodes include information for assisting in searching the B-tree and the one or more leaves indicate the shared mapping and the non-shared mapping.

2. A computer program product as claimed in claim 1, the computer program including code for deleting or modifying the designated target copy.

3. A computer program product as claimed in claim 1, wherein the data mapping includes an indication of whether the physical copy corresponds to a previously created target copy.

4. A computer program product as claimed in claim 3, wherein the indication comprises a flag field.

5. A computer program product as claimed in claim 3, comprising code for comparing a creation time of said data from the source data and said previously created target copy so as to determine the correspondence between the physical copy and said previously created target copy.

6. A data processing system comprising:
a hardware processor;
a computer usable medium connected to the hardware processor, wherein the computer usable medium contains a set of instructions for a space efficient cascading point-in-time copying of source data by creating a plurality of cascading point-in-time target copies, the target copies being created at different points in time, wherein the hardware processor is designed to carry out a set of instructions to:

physically copy data from the source data to a repository to create a physical copy;

create a data mapping that associates the physical copy with a most recent target copy of said plurality of cascading target point-in-time copies, the data mapping indicating shared mapping and non-shared mapping, the shared mapping indicating that an address of the physical copy in the repository, the repository not comprising a cache, is shared with at least one previously created target copy of said plurality of cascading point-in-time copies; wherein the source data includes a time stamp of when a data block of the source data was last modified or overwritten, and if the time stamp indicates the source data is older than a time of creation of a previous target volume which was created prior to the most recent target copy of a most recent target volume, the source data corresponds to logical copies in both the most recent target volume and the previous target volume and the data mapping indicates the source data as shared; otherwise, if the time stamp indicates the source data was modified more recently than the time of creation of the previous target volume which was created prior to the most recent target copy of the most recent target volume, the data mapping indicates the source data as non-shared;

receive a request to perform a read operation on a logical copy of one target copy of said plurality of cascading target point-in-time copies;

in response to the request, directing the read operation to a corresponding address of the repository if the step of physically copying data from the source data was performed prior to the creation of the one target copy of said plurality of cascading target point-in-time copies, and directing the read operation to the logical copy of the one target copy of said plurality of cascading target point-in-time copies if the step of physically copying data from the source data was performed after the creation of the one target copy of said plurality of cascading target point-in-time copies; and update the data mapping of one or more target copies of said plurality of cascading target point-in-time copies that are older than a designated target copy of said plurality of cascading target point-in-time copies, so as to include information relating to the designated target copy;

wherein the data mapping comprises a leaf of a B-tree structure, and the B-tree structure includes inner nodes and one or more leaves, the inner nodes include information for assisting in searching the B-tree and the one or more leaves indicate the shared mapping and the non-shared mapping.

7. A data processing system as claimed in claim 6, wherein the hardware processor is designed to carry out a set of instructions to delete or modify the designated target copy.

8. A data processing system as claimed in claim 6, wherein the data mapping includes an indication of whether the physical copy corresponds to a previously created target copy.

9. A data processing system as claimed in claim 8, wherein the indication comprises a flag field.

10. A data processing system as claimed in claim 8, wherein the hardware processor is designed to carry out a set of instructions to compare a creation time of said data from the source data and said previously created target copy so as to determine the correspondence between the physical copy and said previously created target copy.

11. A computer program product as claimed in claim 1, wherein the B-tree structure includes one or more leaves and the one or more leaves include a flag field indicating the shared mapping or the non-shared mapping.

12. A data processing system as claimed in claim 6, wherein the B-tree structure includes one or more leaves and the one or more leaves include a flag field indicating the shared mapping or the non-shared mapping.

* * * * *